(12) United States Patent
Kim et al.

(10) Patent No.: US 10,978,766 B2
(45) Date of Patent: Apr. 13, 2021

(54) SEPARATOR FOR ELECTROCHEMICAL DEVICE AND ELECTROCHEMICAL DEVICE INCLUDING THE SAME

(71) Applicant: LG CHEM, LTD., Seoul (KR)

(72) Inventors: Chan-Jong Kim, Daejeon (KR); Su-Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 160 days.

(21) Appl. No.: 16/066,396

(22) PCT Filed: Aug. 28, 2017

(86) PCT No.: PCT/KR2017/009382
§ 371 (c)(1),
(2) Date: Jun. 27, 2018

(87) PCT Pub. No.: WO2018/038584
PCT Pub. Date: Mar. 1, 2018

(65) Prior Publication Data
US 2019/0020008 A1    Jan. 17, 2019

(30) Foreign Application Priority Data

Aug. 26, 2016  (KR) .................. 10-2016-0109272

(51) Int. Cl.
*H01M 50/409* (2021.01)
*H01M 10/052* (2010.01)
(Continued)

(52) U.S. Cl.
CPC ....... *H01M 50/409* (2021.01); *H01M 10/052* (2013.01); *H01M 50/403* (2021.01);
(Continued)

(58) Field of Classification Search
None
See application file for complete search history.

(56) References Cited

U.S. PATENT DOCUMENTS

2006/0093922 A1    5/2006   Kim et al.
2009/0067119 A1    3/2009   Katayama et al.
(Continued)

FOREIGN PATENT DOCUMENTS

CN    1753204 A    3/2006
EP    2899777 A1   7/2015
(Continued)

OTHER PUBLICATIONS

International Search Report for PCT/KR2017/009382 (PCT/ISA/210) dated Nov. 28, 2017.

*Primary Examiner* — Alix E Eggerding
(74) *Attorney, Agent, or Firm* — Birch, Stewart, Kolasch & Birch, LLP

(57) ABSTRACT

The present disclosure relates to a separator for an electrochemical device. The separator includes a porous coating layer containing inorganic particles on the surface of a porous polymer substrate, wherein the porous coating layer includes plate-like inorganic particles and spherical inorganic particles as inorganic particles, and shows a step-wise or successive increase in content of inorganic particles a) from the bottom close to the porous polymer substrate to the top, when viewed from the thickness direction of the porous coating layer, and shows a step-wise or successive decrease in content of inorganic particles b) from the bottom close to the porous polymer substrate to the top, when viewed from the thickness direction of the porous coating layer.

8 Claims, 10 Drawing Sheets

(51) Int. Cl.
  *H01M 50/403* (2021.01)
  *H01M 50/446* (2021.01)
  *H01M 50/449* (2021.01)
  *H01M 50/434* (2021.01)
  *H01M 50/414* (2021.01)
  *H01M 4/38* (2006.01)

(52) U.S. Cl.
  CPC ....... *H01M 50/446* (2021.01); *H01M 50/449* (2021.01); *H01M 4/382* (2013.01); *H01M 50/414* (2021.01); *H01M 50/434* (2021.01)

(56) References Cited

U.S. PATENT DOCUMENTS

| | | | |
|---|---|---|---|
| 2014/0322586 A1 | 10/2014 | Lee et al. | |
| 2015/0162585 A1* | 6/2015 | Pan | H01M 10/052 429/144 |
| 2015/0236323 A1* | 8/2015 | Honda | H01M 2/1653 429/144 |

FOREIGN PATENT DOCUMENTS

| | | | |
|---|---|---|---|
| JP | 2013-222581 | * | 4/2012 |
| JP | 2012-190547 A | | 10/2012 |
| JP | 2013-222581 A | | 10/2013 |
| JP | 2015-115321 A | | 6/2015 |
| KR | 10-2014-0070484 A | | 6/2014 |
| KR | 10-2015-0050498 A | | 5/2015 |
| KR | 10-2015-0051556 A | | 5/2015 |
| WO | WO 2007/066768 A1 | | 6/2007 |
| WO | WO 2015/190265 A1 | | 12/2015 |

\* cited by examiner (a)                          (b)

SEPARATOR FOR ELECTROCHEMICAL DEVICE AND ELECTROCHEMICAL DEVICE INCLUDING THE SAME

TECHNICAL FIELD

The present application claims priority to Korean Patent Application No. 10-2016-0109272 filed on Aug. 26, 2016 in the Republic of Korea, the disclosures of which are incorporated herein by reference. The present disclosure relates to a separator for an electrochemical device. Particularly, the present disclosure relates to a separator for an electrochemical device which has improved puncture strength, heat resistance and stability and adhesion to an electrode, and an electrochemical device including the separator.

BACKGROUND ART

As portable electronic instruments, such as cellular phones or notebook computers, have been developed, secondary batteries capable of repeating charge/discharge have been increasingly in demand as energy sources for such electronic instruments. Recently, application of secondary batteries as power sources for hybrid electric vehicles (HEV) and electric vehicles (EV) have been realized. Therefore, many studies have been conducted about secondary batteries which meet various needs. Particularly, needs for lithium secondary batteries having high energy density, high discharge voltage and high output tend to increase.

One of the main subjects of studies about electrochemical devices, such as the above-mentioned secondary batteries, is improvement of safety. For example, when an electrochemical device undergoes an internal short-circuit or is overcharged beyond an acceptable current and voltage, it is overheated to cause thermal runaway or even causes ignition or explosion. To prevent this, a separator may be provided with a shut-down function, or a positive temperature coefficient (PTC) device or current interrupt device (CID) may be used in the case of a cylindrical battery. However, such a shut-down function may be realized over the whole separator to cause perfect insulation between a negative electrode and a positive electrode, or a time delay may occur until the PTC device/CID device is activated. Therefore, there is a need for developing a novel technology to improve safety related with overheating of an electrochemical device.

DISCLOSURE

Technical Problem

The present disclosure is designed to solve the problems of the related art, and therefore the present disclosure is directed to providing a separator for an electrochemical device which has improved heat resistance and stability and puncture strength. It will be easily understood that the other objects and advantages of the present disclosure may be realized by the means shown in the appended claims and combinations thereof.

Technical Solution

In one aspect of the present disclosure, there is provided a separator for an electrochemical device. According to a first embodiment of the present disclosure, there is provided a separator including: a porous polymer substrate including a polymer resin; and a porous coating layer formed on at least one surface of both surfaces of the porous polymer substrate, wherein the porous coating layer shows a step-wise or successive increase in content of inorganic particles a) from the bottom close to the porous polymer substrate to the top, when viewed from the thickness direction of the porous coating layer, and shows a step-wise or successive decrease in content of inorganic particles b) from the bottom close to the porous polymer substrate to the top, when viewed from the thickness direction of the porous coating layer; and the inorganic particles a) are plate-like inorganic particles and the inorganic particles b) are spherical inorganic particles.

According to a second embodiment, there is provided the separator of the first embodiment, wherein the porous coating layer includes the inorganic particles b) at a higher content in the portion from the bottom close to the porous polymer substrate to 10% of the thickness, and includes the inorganic particles a) at a higher content in the portion from the surface of the porous coating layer to 10% of the thickness, when viewed from the thickness direction.

According to a third embodiment, there is provided the separator of the first or the second embodiment, wherein the porous coating layer includes the inorganic particles b) in an amount of 50 wt % or more based on 100 wt % of the combined weight of the inorganic particles a) and b) in the portion from the bottom close to the porous polymer substrate to 10% of the thickness, when viewed from the thickness direction.

According to a fourth embodiment, there is provided the separator of the first to the third embodiments, wherein the porous coating layer includes the inorganic particles a) in an amount of 50 wt % or more based on 100 wt % of the combined weight of the inorganic particles a) and b) in the portion from the surface of the porous coating layer facing to an electrode to 10% of the thickness, when viewed from the thickness direction.

According to a fifth embodiment, there is provided the separator of the first to the fourth embodiments, wherein the plate-like inorganic particles a) have an aspect ratio more than 3 and equal to or less than 100.

According to a sixth embodiment, there is provided the separator of the first to the fifth embodiments, wherein the plate-like inorganic particles a) are boehmite.

According to a seventh embodiment, there is provided the separator of the first to the sixth embodiments, wherein the spherical inorganic particles b) have an aspect ratio of 1-3.

According to an eighth embodiment, there is provided the separator of the first to the seventh embodiments, wherein the porous coating layer includes a mixture of the plate-like inorganic particles a), the spherical inorganic particles b) and a binder resin, wherein the binder resin is present in an amount of 3-10 wt % based on the total weight of the porous coating layer.

According to a ninth embodiment, there is provided the separator of the first to the eighth embodiments, wherein the separator has a puncture strength of 0.26 kgf or more.

According to an tenth embodiment, there is provided an electrochemical device which includes a positive electrode, a negative electrode and a separator interposed between the positive electrode and negative electrode, wherein the negative electrode includes lithium metal and the separator is defined in any one of the first to the ninth embodiments.

According to an eleventh embodiment, there is provided a separator for an electrochemical device which includes: a porous polymer substrate including a polymer resin; and a porous coating layer formed on at least one surface of both surfaces of the porous polymer substrate, wherein the porous coating layer includes a) plate-like inorganic particles and b)

spherical inorganic particles b); and the porous coating layer includes the inorganic particles b) at a higher content, as compared to the inorganic particles a), in the portion from the bottom close to the porous polymer substrate to 10% of the thickness, and includes the inorganic particles a) in an amount of 50 wt % or more based on 100 wt % of the combined weight of the inorganic particles a) and b) in the portion from the surface of the porous coating layer facing to an electrode to 10% of the thickness, when viewed from the thickness direction.

According to a twelfth embodiment, there is provided a separator for an electrochemical device which includes: a porous polymer substrate including a thermoplastic resin; and a porous coating layer formed on at least one surface of both surfaces of the porous polymer substrate, wherein the porous coating layer includes inorganic particles and a binder resin; the inorganic particles are integrated through dot binding and/or face binding by means of the binder resin; the porous coating layer includes a) plate-like inorganic particles having an aspect ratio more than 3 and equal to or less than 20 and b) spherical inorganic particles having an aspect ratio of 1-3; the porous coating layer includes the inorganic particles b) at a higher content as compared to the inorganic particles a) in the portion from the bottom close to the porous polymer substrate to 10% of the thickness, and includes the inorganic particles a) in an amount of 50 wt % or more based on 100 wt % of the combined weight of the inorganic particles a) and b) in the portion from the surface of the porous coating layer facing to an electrode to 10% of the thickness, when viewed from the thickness direction; and the aspect ratio is defined as [length of longer axis direction/width of direction orthogonal to longer axis direction].

Advantageous Effects

The separator according to the present disclosure includes plate-like inorganic particles distributed on the surface thereof, thereby providing an effect of inhibiting growth of dendrite from a negative electrode and preventing puncture caused by dendrite. In addition, since a large number of spherical inorganic particles are distributed near the surface of a polymer film substrate, interfacial adhesion between the polymer substrate film and a porous coating layer is improved. As a result, an electrochemical device including the separator according to the present disclosure shows improved safety during use.

DESCRIPTION OF DRAWINGS

The accompanying drawings illustrate a preferred embodiment of the present disclosure and together with the foregoing disclosure, serve to provide further understanding of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is linked to another portion' includes not only 'one portion is linked directly to another portion' but also 'one portion is linked electrically to another portion with the other portion interposed between them'.

In one aspect, there is provided a separator for an electrochemical device which includes a porous substrate and a porous coating layer formed on at least one surface of both surfaces of the porous substrate. According to the present disclosure, the porous coating layer includes a mixture of a) plate-like inorganic particles, b) spherical inorganic particles, and a binder resin. According to an embodiment of the present disclosure, the plate-like inorganic particles among the inorganic particles are distributed largely in the upper portion of the porous coating layer close to the portion facing an electrode, and the spherical inorganic particles among the inorganic particles are distributed largely in the lower portion close to the portion facing the porous substrate. As used herein, the expression 'distributed largely' refers to a weight ratio of 50% or more.

Figure 1:
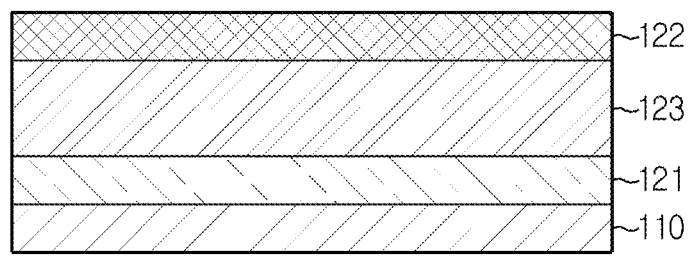
FIG. 1 is a sectional view illustrating the separator according to an embodiment of the present disclosure.
Figure 2A:
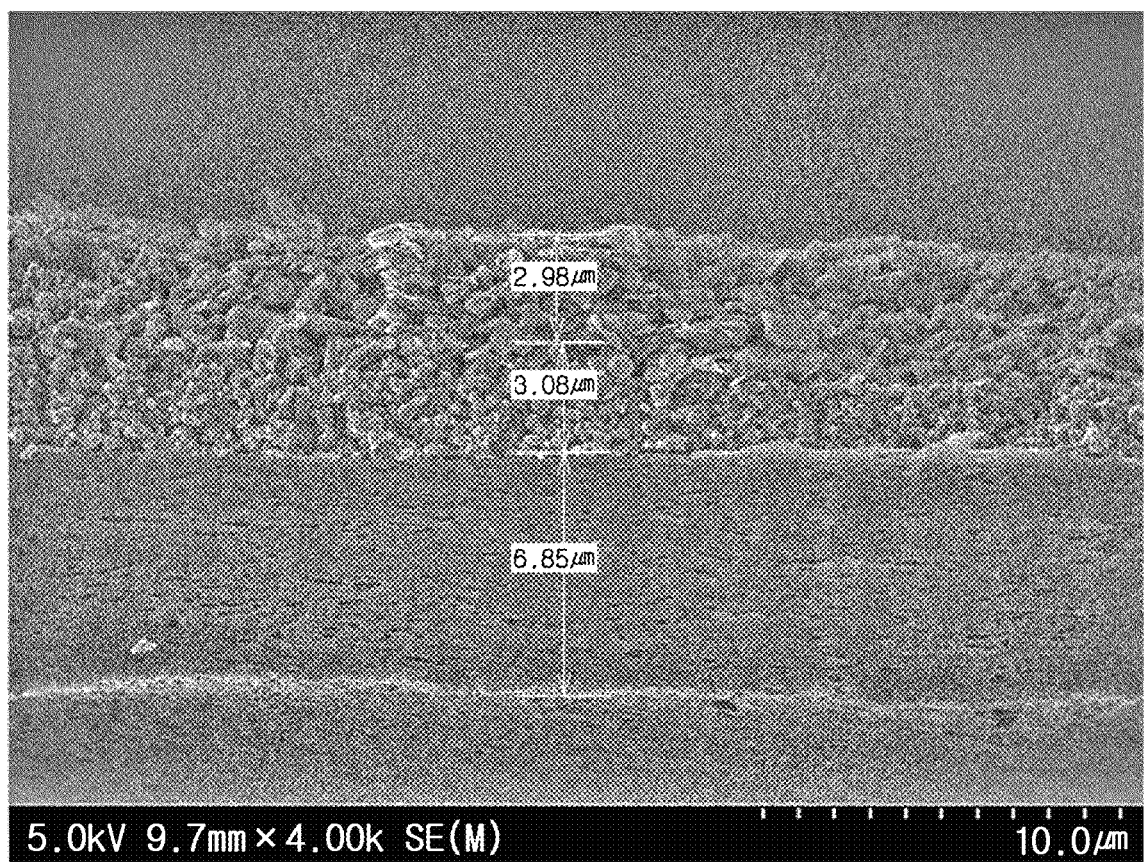
FIG. 2a and FIG. 2b are scanning electron microscopic (SEM) images illustrating the sectional surface of the separator according to an embodiment of the present disclosure.
Figure 2B:
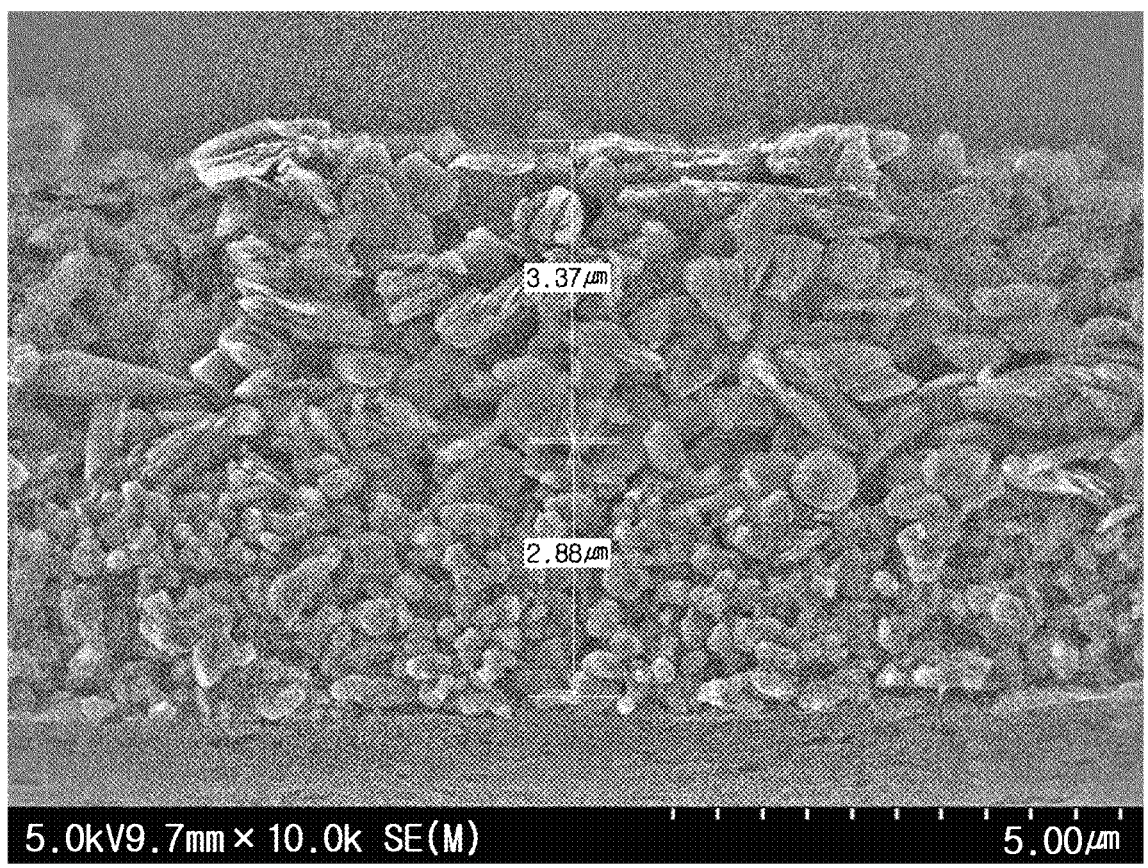
Figure 2C:
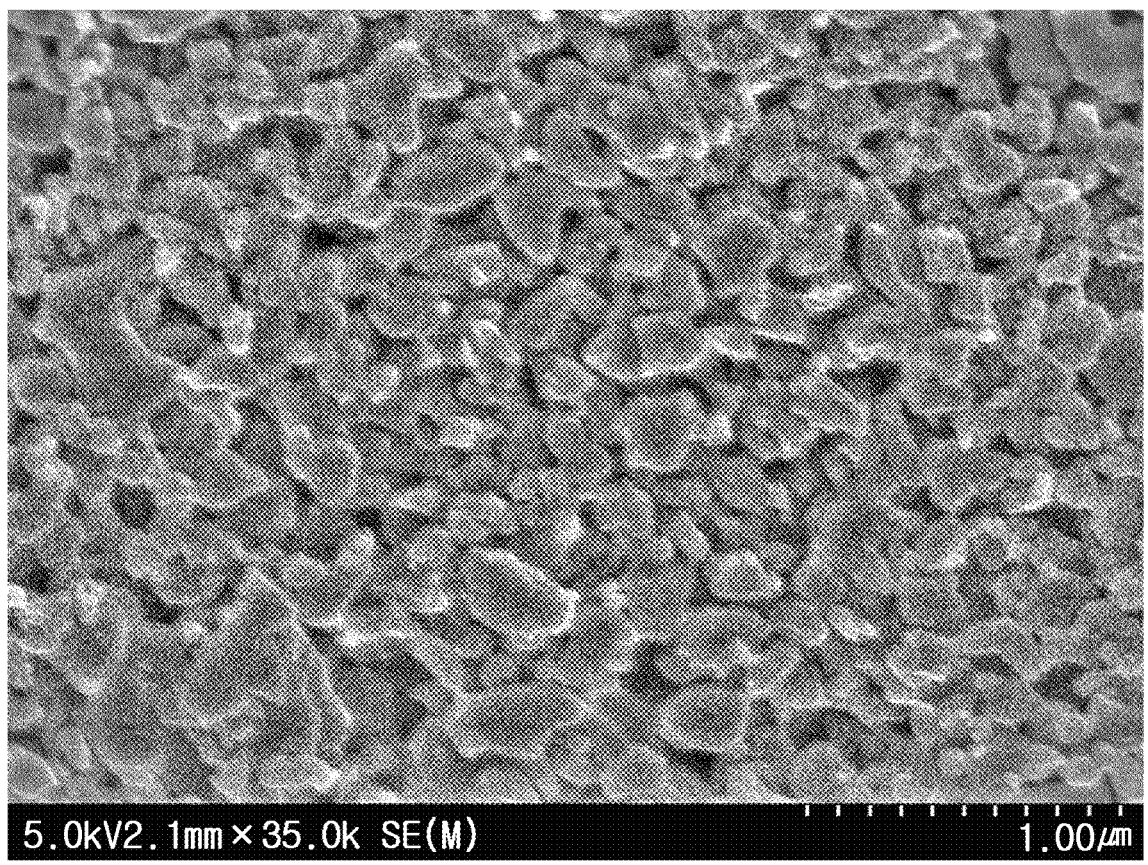
FIG. 2c is an SEM image illustrating the surface of the separator according to an embodiment of the present disclosure.
Figure 3:
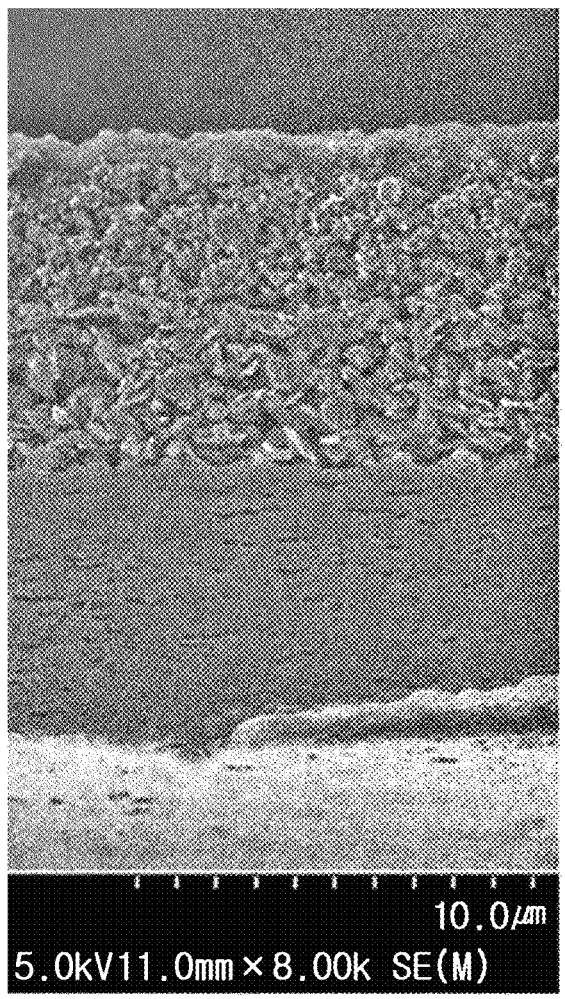
FIG. 3 is an SEM image illustrating the sectional surface of the separator according to Comparative Example 1.
Figure 3:
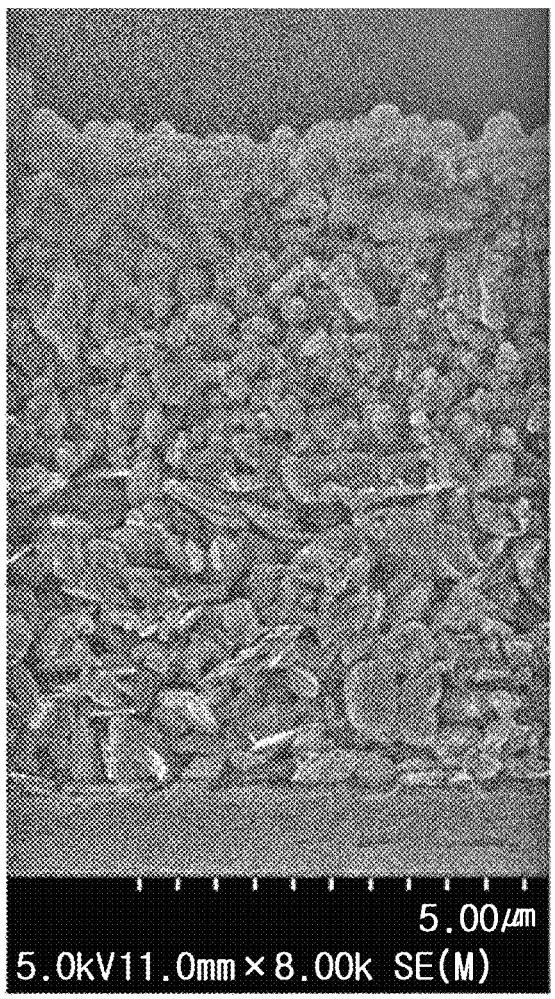
Figure 4A:
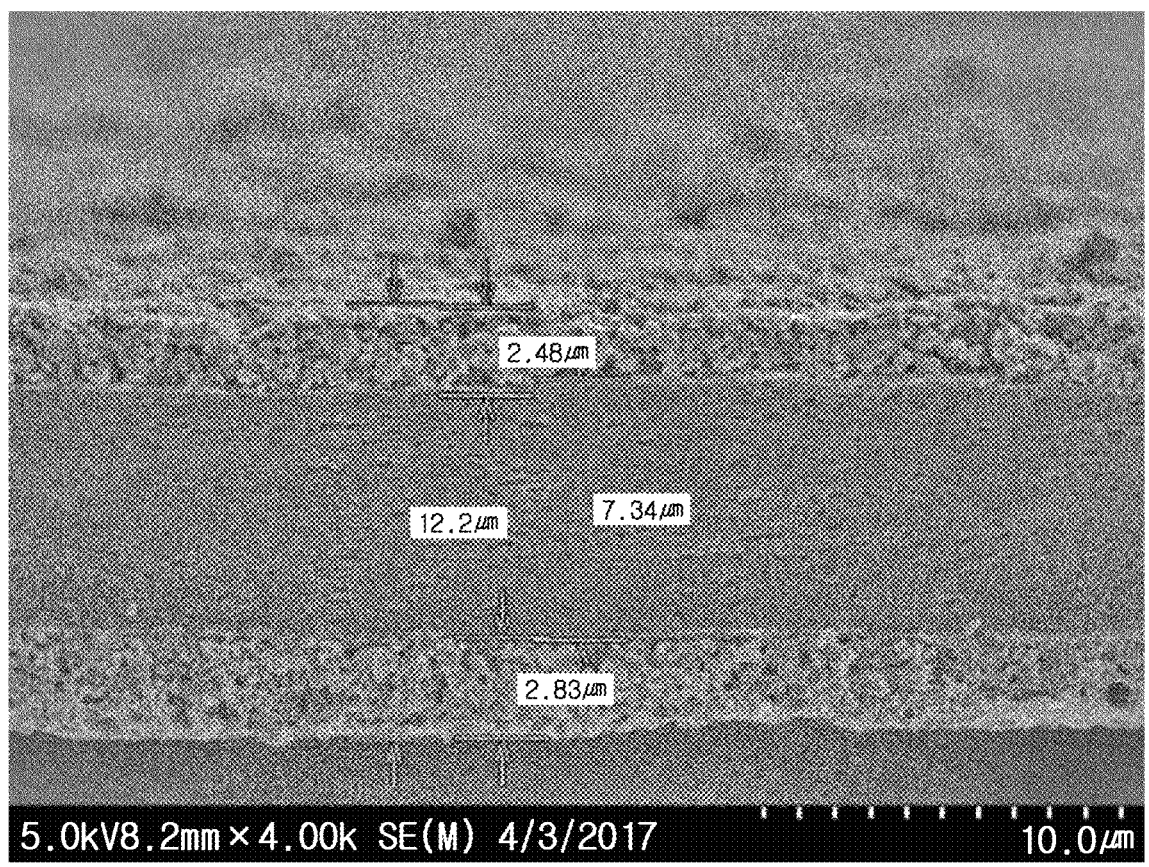
FIG. 4a and FIG. 4b are SEM images illustrating the sectional surface of the separator according to Comparative Example 2.
Figure 4B:
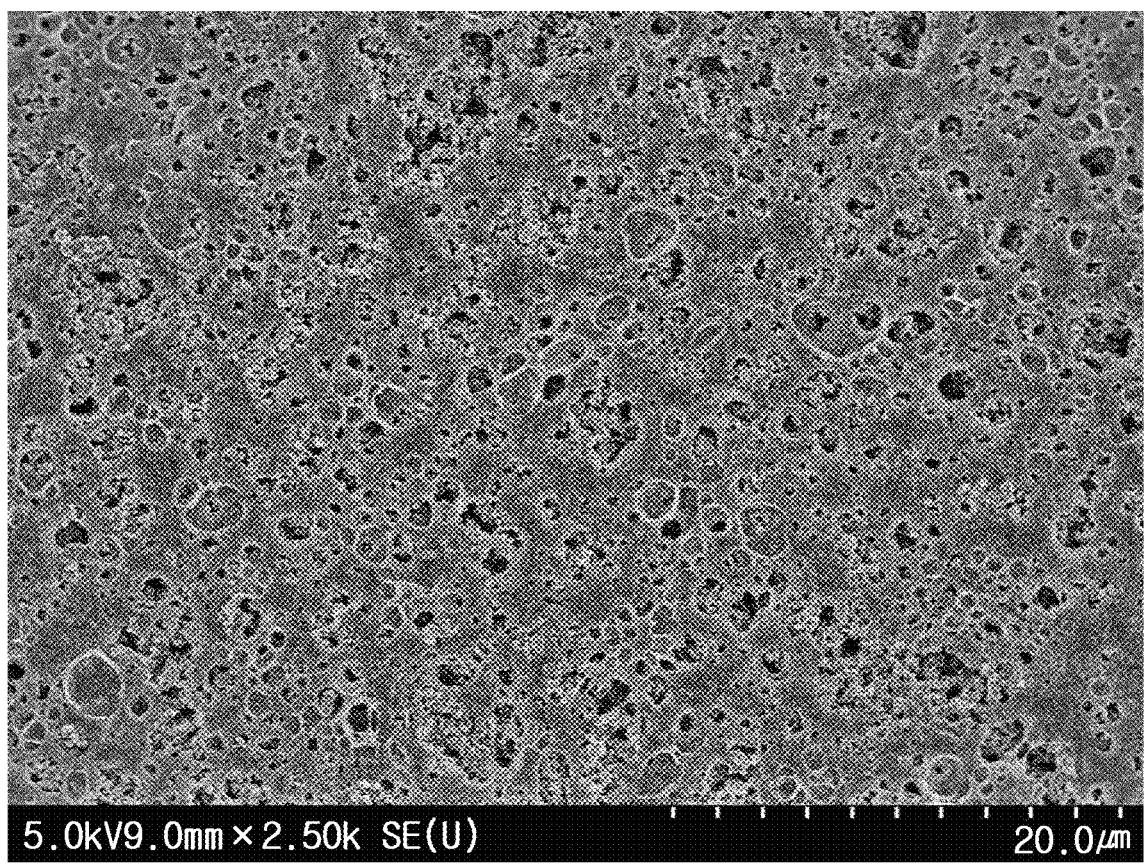
Figure 5A:
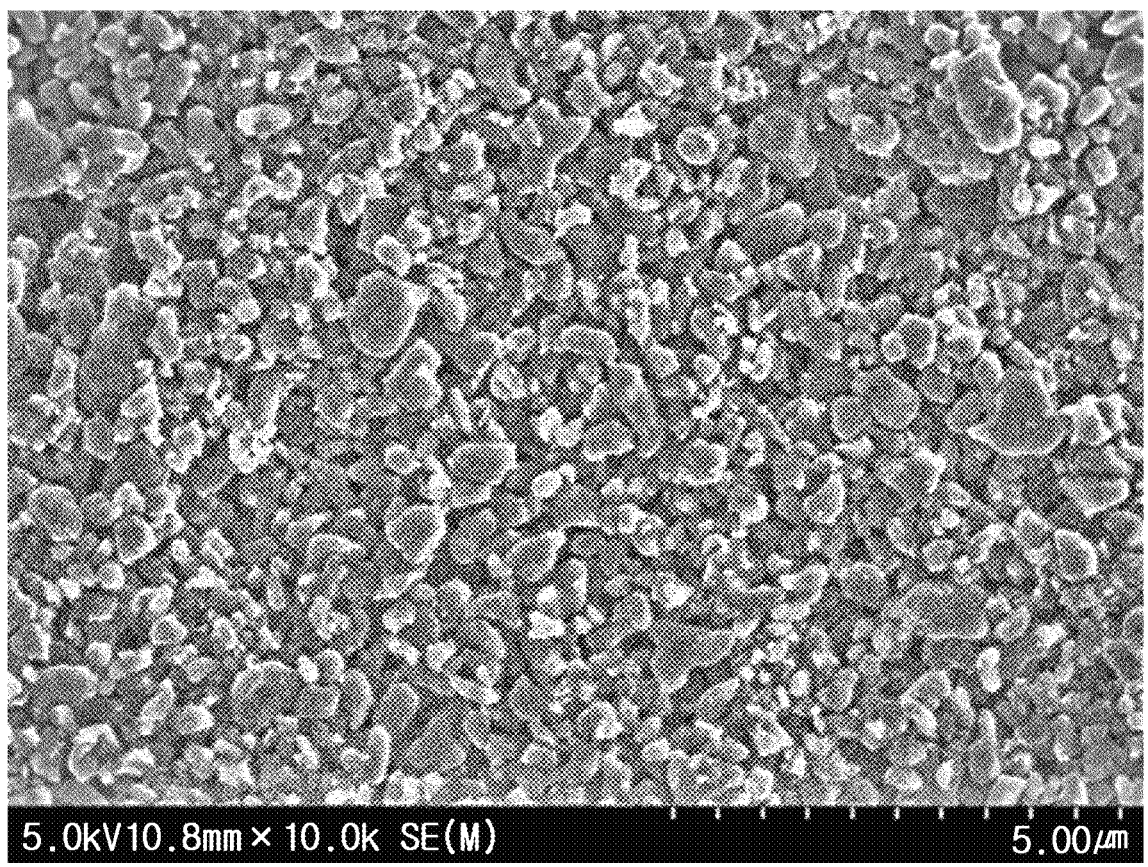
FIG. 5a and FIG. 5b are SEM images illustrating the spherical particles used in Examples and Comparative Examples.
Figure 5B:
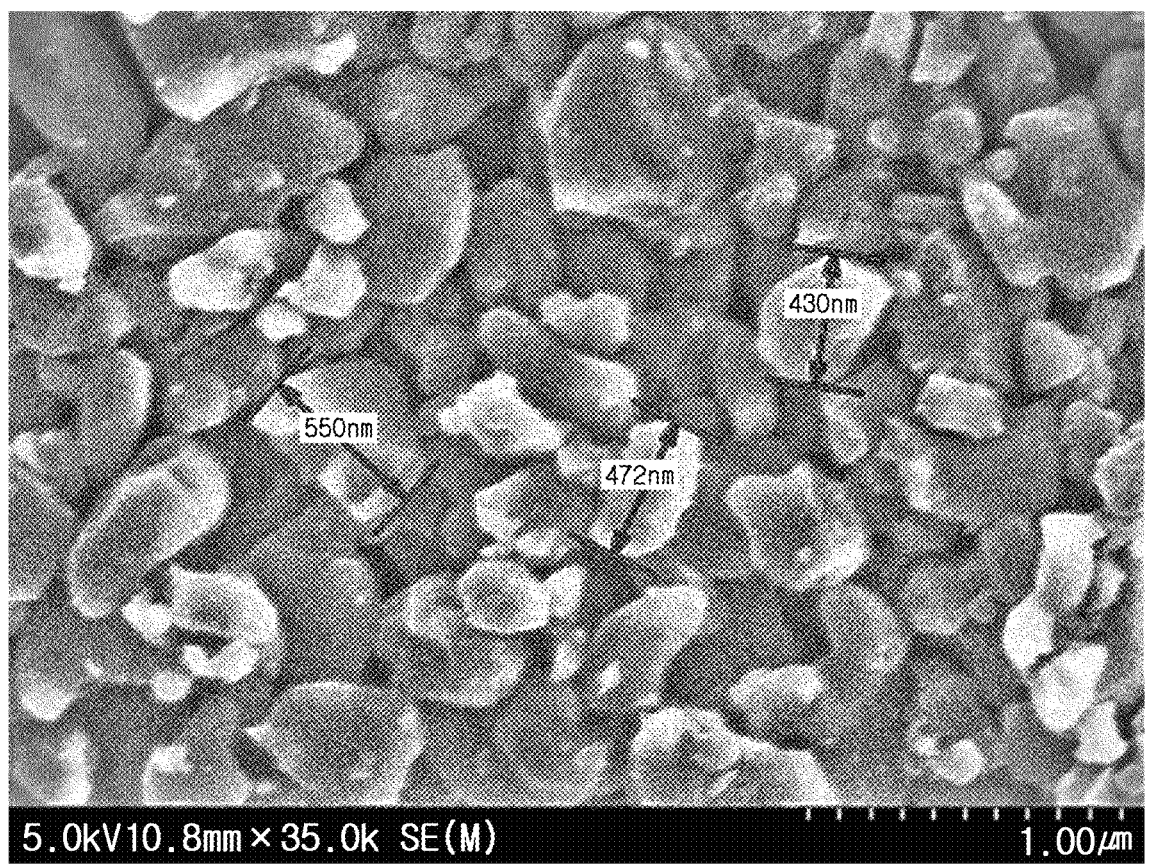
Figure 6A:
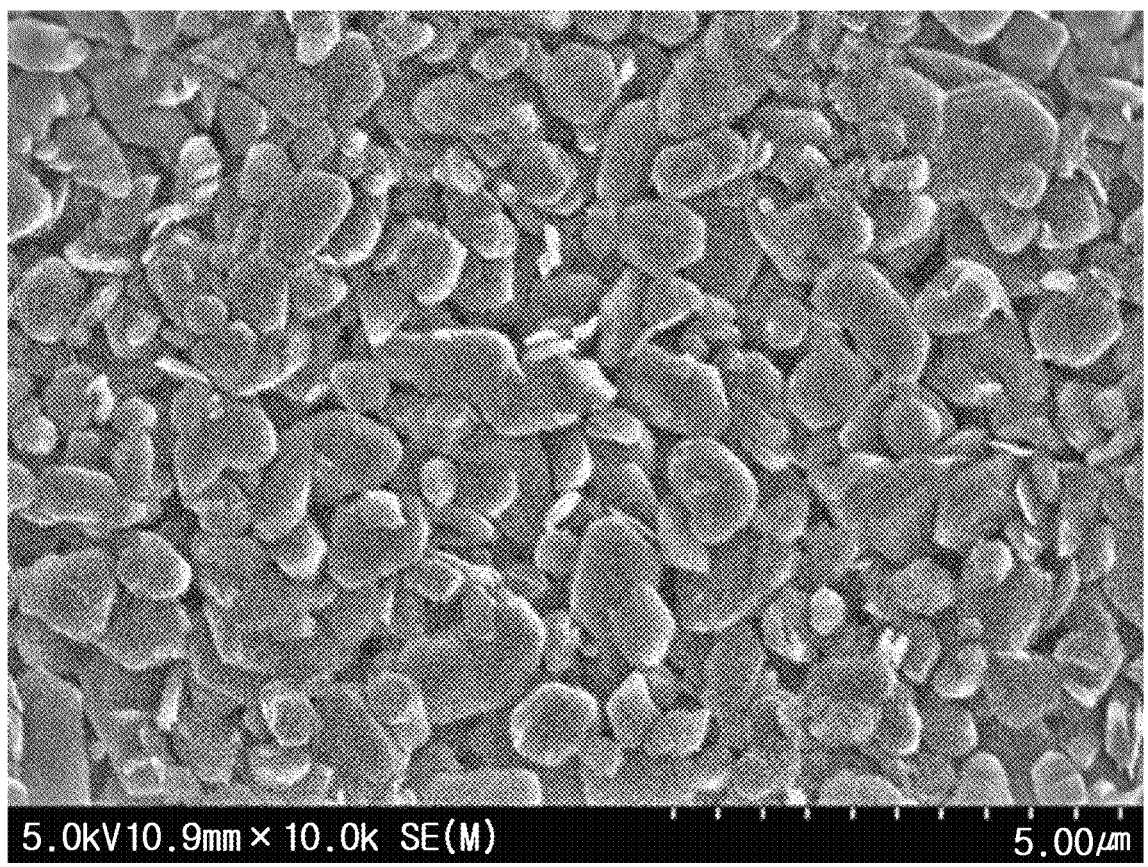
FIG. 6a and FIG. 6b are SEM images illustrating the plate-like particles used in Examples and Comparative Examples.
Figure 6B:
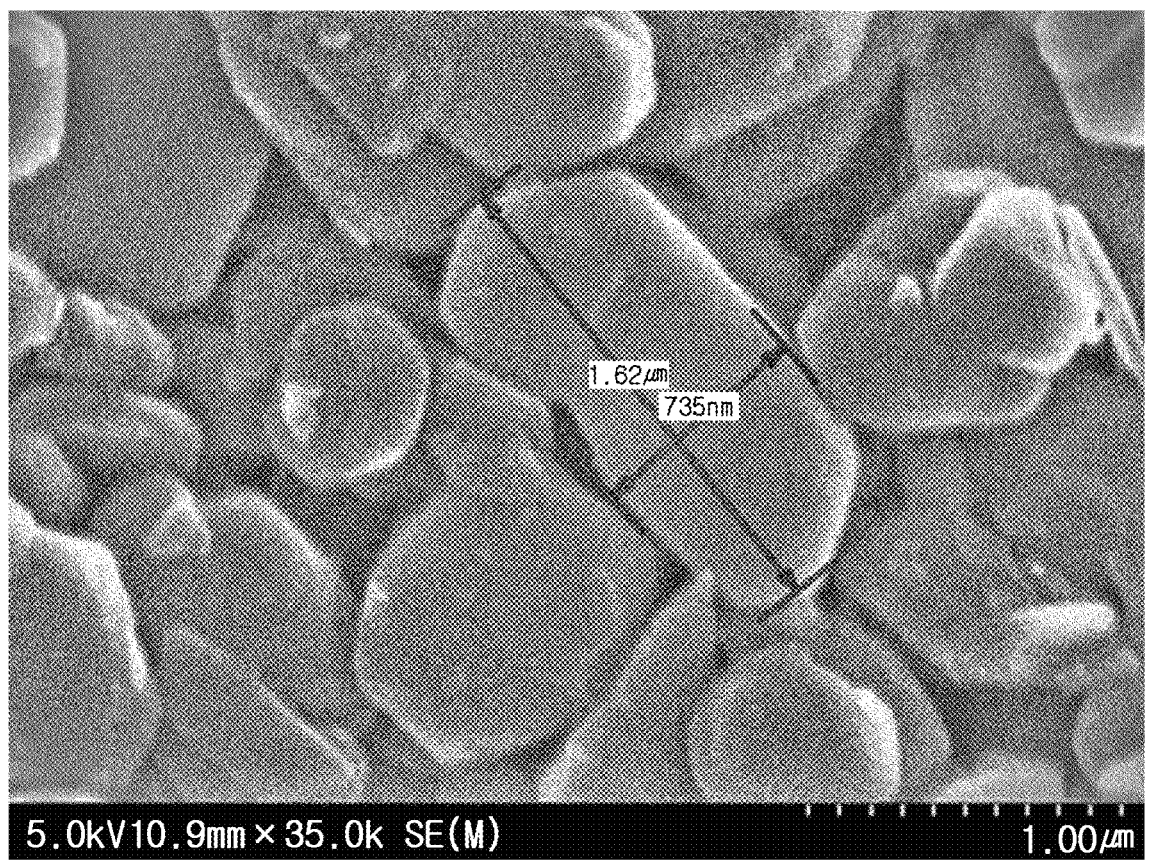

FIG. 1 is a section view illustrating the separator according to an embodiment of the present disclosure. Hereinafter, the present disclosure will be described in detail with reference to the drawing.

Referring to FIG. 1, the separator 100 according to an embodiment of the present disclosure includes a porous substrate 110 and a porous coating layer 120 provided on at least one surface of the porous substrate.

According to the present disclosure, the porous substrate is not particularly limited, as long as it includes a thermoplastic resin, has electrical insulation property, is electrochemically stable and is stable against the electrolyte as described hereinafter. According to an embodiment of the present disclosure, particular examples of the thermoplastic resin include: polyolefins, such as polyethylene (PE), polypropylene (PP) and ethylene propylene copolymers; polyesters, such as polyethylene terephthalate and copolymerized polyester; or the like. Particularly, polyolefins which are low-cost raw materials and have excellent processability are preferred. Herein, the thermoplastic resin may be present in an amount of at least 50 vol %, at least 70 vol %, or at least 90 vol % based on the total volume of the ingredients forming the porous substrate.

According to an embodiment of the present disclosure, the porous substrate may include a porous polymer film or porous polymer nonwoven web. For example, the porous substrate may be a porous polymer film or porous polymer nonwoven web including polyolefin, such as polyethylene or polypropylene. According to the present disclosure, the polyolefin porous polymer film may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination of two or more of them.

In addition, the porous polymer film and porous nonwoven web may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Next, the porous coating layer will be explained.

According to an embodiment of the present disclosure, the porous coating layer is formed on at least one surface of the porous substrate and includes a mixture of inorganic particles with a binder resin. According to the present disclosure, the binder resin is present in an amount of 1-10 wt % based on the total weight of the porous coating layer. According to a preferred embodiment of the present disclosure, the binder resin is present in an amount of at least 1 wt %, at least 2 wt % or at least 5 wt % in the porous coating layer. According to a preferred embodiment of the present disclosure, the binder resin is present in an amount of at most 7 wt % or at most 5 wt % in the porous coating layer. According to the present disclosure, the porous coating layer functions to impart heat resistance to the separator. For example, when the internal temperature of a battery is increased so that the porous substrate may be shrunk, the porous coating layer functions as a backbone of the separator so that heat shrinking of the porous substrate may be inhibited.

According to the present disclosure, the porous coating layer is one that is formed by integration of the inorganic particles through the dot binding and/or face binding by means of the binder resin. The porous coating layer has a porous structure derived from the interstitial volumes among the inorganic particles. Such a porous coating layer contributes to the planarization of the surface of an electrode and improves the heat resistance of the porous substrate.

According to an embodiment of the present disclosure, the inorganic particles are electrochemically stable and preferably cause no oxidation and/or reduction in the range (e.g. 0-5V based on Li/Li$^+$) of driving voltages of an applicable electrochemical device. Particularly, it is preferred to use inorganic particles having a high dielectric constant. This is because such inorganic particles improve the ion conductivity of an electrolyte by increasing the dissociation degree of an electrolyte salt, such as a lithium salt, in a liquid electrolyte. In addition, the inorganic particles have heat resistance of a heat resistant temperature of 150° C. or higher and electrical insulation property, and preferably are stable against a solvent used for preparing an electrolyte or separator upon the application to a battery. As used herein, a heat resistant temperature of 150° C. or higher means that any deformation, such as softening, cannot be observed at 150° C. or higher.

According to the present disclosure, the porous coating layer includes a) plate-like inorganic particles and b) spherical particles, as inorganic particles. According to an embodiment of the present disclosure, in the porous coating layer, the content of the inorganic particles a) increases step-wisely or gradually from the bottom close to the porous substrate to the top, when viewed from the thickness direction of the porous coating layer. In addition, the content of the inorganic particles b) decreases step-wisely or gradually from the bottom close to the porous substrate to the top.

According to an embodiment of the present disclosure, the porous coating layer may have a bilayer structure including an upper layer and a lower layer. Herein, the upper layer may include the plate-like inorganic particles in an amount of at least 50 wt %, at least 60 wt %, at least 70 wt %, at least 80 wt %, at least 90 wt % or at least 99.9 wt % based on 100 wt % of the total inorganic particles. In addition, the lower layer may include the spherical inorganic particles in an amount of at least 50 wt %, at least 60 wt %, at least 70 wt %, at least 80 wt %, at least 90 wt % or at least 99.9 wt % based on 100 wt % of the total inorganic particles.

In other words, in the porous coating layer according to the present disclosure, the inorganic particles are distributed in such a manner that a large number of spherical particles among the inorganic particles may be distributed at the side of the portion facing to the porous substrate, while a large number of plate-like inorganic particles may be distributed at the surface of the porous coating layer, i.e., at the side of the portion facing to an electrode.

To describe the constitutional characteristics of the separator according to the present disclosure effectively, the portion corresponding to 50%, 30%, 20% or 10% or less of the thickness toward the upper side, when viewed from the side facing to the porous substrate (porous substrate-facing portion), is called a lower layer portion. In addition, the surface portion of the porous coating layer, i.e., the portion corresponding to 50%, 30%, 20% or 10% or less of the thickness toward the lower side, when viewed from the side facing to an electrode (i.e., electrode-facing portion) is called an upper layer portion. In FIG. 1, the portion represented by reference numeral 122 is the upper layer portion and the portion represented by reference numeral 121 is the lower layer portion.

According to a more preferred embodiment of the present disclosure, the lower layer portion of the porous coating layer includes the spherical inorganic particles b) at a higher content among the inorganic particles, and the upper layer portion of the porous coating layer includes the plate-like inorganic particles a) at a higher content among the inorganic particles. According to an embodiment of the present disclosure, the lower layer portion includes the spherical inorganic particles b) in an amount of 50 wt % or more based on 100 wt % of the combined weight of the plate-like inorganic particles a) and the spherical inorganic particles b). In addition, the upper layer portion includes the plate-like inorganic particles a) in an amount of 50 wt % or more based on 100 wt % of the combined weight of the plate-like inorganic particles a) and the spherical inorganic particles b).

According to an embodiment of the present disclosure, the plate-like inorganic particles have an aspect ratio more than 3 and equal to or less than 100, more than 3 and equal to or less than 40, or more than 3 and equal to or less than 20. According to the present disclosure, the aspect ratio may be represented by [length of longer axis direction/ width of direction orthogonal to longer axis direction]. According to an embodiment of the present disclosure, the plate-like inorganic particles are not particularly limited, as long as they satisfy the above-mentioned condition. For example, the plate-like inorganic particles are boehmite (AlOOH) and/or magnesium hydroxide ($Mg(OH)_2$) preferably. For example, the aspect ratio, length of longer axis direction and the width may be obtained by analyzing images taken by scanning electron microscopy (SEM). In addition, according to an embodiment of the present disclosure, the plate-like inorganic particles have a particle diameter ($D_{50}$) of 0.5-10 µm, 0.5-5 µm, or 0.5-2 µm based on the longer axis.

The plate-like inorganic particles a) shows an average angle of the flat plate of 30° or less, or 0° to a plane parallel to the surface of the porous substrate, in the porous coating layer. When the plate-like inorganic particles a) are oriented in the above-mentioned manner, it is possible to effectively prevent lithium dendrite deposited on the electrode surface or an internal short-circuit that may be generated by protrusions of active materials on the electrode surface. Meanwhile, the configuration of the plate-like inorganic particles a) may be determined by observing the section of the separator by SEM.

According to the present disclosure, the spherical inorganic particles b) have an aspect ratio of 1-3. Herein, 'spherical particles' are those having a spherical shape or pseudo-spherical shape. Herein, 'pseudo-spherical' refers to particles which have the volume of a three-dimensional figure whose section has a circular, ellipsoidal, rectangular or a closed curve shape corresponding thereto and also covers any shapes of particles, including amorphous particles whose shape cannot be specified. According to the present disclosure, non-limiting examples of the spherical inorganic particles b) may be at least one selected from the group consisting of $BaTiO_3$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$. In addition, the spherical inorganic particles have a particle diameter ($D_{50}$) of at least 0.01 µm, at least 0.05 µm, at least 0.1 µm, at least 0.3 µm, or at least 0.5 µm, based on the longer axis. When the particle diameter of the spherical inorganic particles is significantly smaller than the above-defined range, the porous coating layer may have a small pore diameter, resulting in degradation of air permeability. Meanwhile, when the particle diameter of the spherical inorganic particles is excessively large, the effect of improving heat resistance of the porous coating layer may be degraded. Thus, the particle diameter ($D_{50}$) of the spherical inorganic particles is at most 15 µm, at most 5 µm, at most 2 µm, or at most 1 µm.

According to the present disclosure, the particle diameter ($D_{50}$) of the particles means the particle size ($D_{50}$) of 50% of the integrated value from a smaller particle diameter calculated based on the results of measurement of particle size distribution of the particles after the classification thereof using a conventional particle size distribution measuring system. Such particle size distribution can be determined by an intensity pattern of diffraction or scattering generated by the contact of light with the particles. Particular examples of the particle size distribution measuring system include Microtrack 9220FRA or Microtrack HRA available from Nikkiso, Inc.

Meanwhile, according to an embodiment of the present disclosure, the whole or at least a part of the inorganic particles contained in the porous coating layer may have a secondary particle structure formed by aggregation of primary particles. In this manner, it is possible to ensure a better effect of preventing a short-circuit. It is also possible to prevent the particles from being in close contact with each other to a certain degree and to retain voids among the particles adequately, thereby providing an effect of retaining a high level of ion permeability of the porous coating layer.

According to the present disclosure, the binder resin allows the inorganic particles to be bound among them and to be bound with the porous substrate. In addition, the binder resin can contribute to the interfacial adhesion between the separator and an electrode. According to an embodiment of the present disclosure, the binder resin includes any one binder resin selected from the group consisting of polyvinylidene fluoride-co-hexafluoropropylene, polyvinylidene fluoride-co-trichloroethylene, polymethylmethacrylate, polyethyl acrylate, polymethyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinylalcohol, cyanoethyl cellulose, cyanoethyl sucrose, pullulan and carboxymethyl cellulose, or a combination of two or more of them.

The separator according to the present disclosure can ensure heat resistance and safety during use by virtue of the above-described constitutional characteristics. In other words, since the spherical inorganic particles are distributed on the surface portion of the porous substrate, uniform surface coating is allowed to provide excellent interfacial adhesion with the porous substrate. In addition, the upper layer portion, i.e.. the electrode-facing portion is configured so that the plate-like microparticles may be distributed therein. Thus, it is possible to inhibit growth of dendrite and to improve puncture strength against dendrite. The separator according to the present disclosure includes the plate-like inorganic particles distributed on the surface thereof to ensure a puncture strength of about 0.26 kgf or more. As used herein, the term 'puncture strength' means the resistance of a separator against external dangers, such as puncture caused by an external object. The unit of puncture strength is 'gf' or 'kgf' and puncture strength may be used interchangeably with 'perforation strength' or 'penetration strength'. In general, as the value of puncture strength increases, the ratio of internal short-circuit defects in a separator decreases. For example, a puncture test may be carried out by allowing a needle with a predetermined diameter to penetrate vertically through a separator at a predetermined speed and measuring the force applied at that time.

In still another aspect, there is provided a method for manufacturing the separator having the above-described characteristics. Hereinafter, the method for manufacturing a separator according to the present disclosure will be explained.

First, a porous substrate is prepared. Next, the first slurry for a lower layer portion, the second slurry for an upper layer portion and the third slurry are prepared. The first slurry (for a lower layer portion) includes inorganic particles and a binder resin, wherein the inorganic particles are totally spherical inorganic particles or includes spherical inorganic particles in an amount of 50 wt % or more based on the total weight of the inorganic particles. The second slurry (for an upper layer) includes inorganic particles and a binder resin, wherein the inorganic particles are totally plate-like inomanic particles of includes plate-like inorganic particles in an amount of 50 wt % or more based on the total weight of the inorganic particles. The third slurry (interposition between the upper layer portion and the lower layer portion) is used for forming an intermediate layer between the upper layer portion and the lower layer portion, and includes inorganic particles and a binder resin. In the intermediate layer, the in organic particles may include plate-like inorganic particles and spherical inorganic particles in the same amount or either type of inorganic particles may be present in a larger amount. Each slurry further includes a solvent for dispersing the inorganic particles and binder. In addition, the slurry may optionally further include adequate additives, such as a thickener, dispersant, or the like.

After the porous substrate and each slurry are prepared, the first slurry, the third slurry and the second slurry are applied sequentially from the surface of the porous substrate and then dried. Herein, application of slurry may be carried out by drying slurry of the underlying layer and then applying slurry of the upper layer. Otherwise, application of slurry may be carried out in a wet-on-wet mode and then simultaneous drying may be carried out.

The third slurry is an optional element. According to an embodiment, it is possible to apply the second slurry directly after applying the first slurry without application of the third slurry.

According to an embodiment of the present disclosure, application methods for slurry may include conventional coating methods, such as dip coating, doctor blade coating, or the like. For example, simultaneous application using a multiple slot die may be carried out. However, application methods or coating methods are not limited thereto.

In yet another aspect, there is provided an electrode assembly including the separator for an electrochemical device. According to the present disclosure. the electrode assembly includes a positive electrode, a negative electrode and a separator interposed between the positive electrode and the negative electrode, wherein the separator is the separator according to the present disclosure. When the separator has the above-described porous coating layer merely on one surface of the porous substrate, the porous coating layer faces the negative electrode in the electrode assembly.

According to an embodiment of the present disclosure, the positive electrode may include, as a positive electrode active material, lithium manganese oxide, such as $Li_{1+x}Mn_{2-x}O_4$ (wherein x is 0-0.33), $LiMnO_3$, $LiMn_2O_3$ or $LiMnO_2$; Ni site-type lithium nickel oxide represented by the chemical formula of $LiNi_{1-x}M_xO_2$ (wherein M=Mn and x=0.01-0.3); lithium manganese composite oxide represented by the chemical formula of $LiMn_{2-x}M_xO_2$ (wherein M=Co, Ni, Fe, Cr, Zn or Ta and x=0.01-0.1) or $Li_2Mn_3MO_8$ (wherein M=Fe, Co, Ni, Cu or Zn); $LiMn_2O_4$ in which Li is partially substituted with alkaline earth metal ions; $LiNi_xMn_{2-x}O_4$ (wherein $0.01 \leq x \leq 0.6$); or the like.

According to an embodiment of the present disclosure, the negative electrode may include, as a negative electrode active material, lithium metal, carbon and graphite materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds containing the above elements; metals and metallic compounds, and composite compounds of carbon and graphite materials: lithium-containing nitrides; or the like. Among them, lithium metal is preferred.

In addition, other battery elements not described herein, such as a conductive material, binder resin and an electrolyte, may be used and they may include those used conventionally in the field of a battery, particularly in the field of a lithium secondary battery.

Hereinafter, the present disclosure will be explained in detail with reference to the examples. The following examples are for illustrative purposes only and not intended to limit the scope of the present disclosure.

1. Manufacture of Separator

EXAMPLE 1

First, a polyethylene porous polymer substrate was prepared (polyethylene, thickness 7 μm, porosity 32%). Next, the first slurry and the second slurry were prepared. The first slurry was prepared by mixing a solvent (mixture containing distilled water and ethanol at a weight ratio of 95:5) with alumina ($Al_2O_3$, $D_{50}$:0.5 μm) particles, polyacrylate and carboxymethyl cellulose (CMC) as a thickener at a ratio of 98:1:1. The alumina particles have an aspect ratio of 1-1.5. In addition, the second slurry was prepared by mixing the solvent with $Mg(OH)_2$ ($D_{50}$: 1.1 μm), polyacrylate and CMC as a thickener at a ratio of 98:1:1. Herein, $Mg(OH)_2$ has an aspect ratio of about 3.1-5. Each slurry has a solid content of 5%. To prevent aggregation of inorganic particles, beads were introduced to the first slurry and the second slurry in the same amount as the inorganic particles. In addition, a wetting agent (anionic compound, sodium sulfate <1%) was added to reduce the contact angle between the beads and the solvent. The mixture was blended by using a paint shaker system twice, each time for 50 minutes.

A doctor blade system was used to apply the first slurry onto the polymer substrate and dried at room temperature by using a drying system to prevent liquid concentration caused by the surface tension of the solvent. Next, the second slurry was applied and dried in the same manner as described above. Spherical particles were distributed largely in the lower layer of the resultant separator and the lower layer had a thickness of about 3.8 μm. In addition, plate-like particles were distributed largely in the upper layer and the upper layer had a thickness of about 3.0 μm.

COMPARATIVE EXAMPLE 1

First, a polyethylene porous polymer substrate was prepared (polyethylene, thickness 7 μm, porosity 32%). Next, the first slurry and the second slurry were prepared. The first slurry was prepared by mixing a solvent (mixture containing distilled water and ethanol at a weight ratio of 95:5) with alumina ($Al_2O_3$, $D_{50}$: 0.5 μm) particles, polyacrylate and carboxymethyl cellulose (CMC) as a thickener at a ratio of 98:1:1. The alumina particles have an aspect ratio of 1-1.5. In addition, the second slurry was prepared by mixing the solvent with $Mg(OH)_2$ ($D_{50}$: 1.1 μm), polyacrylate and CMC as a thickener at a ratio of 98:1:1. Each slurry has a solid content of 5%. Meanwhile. $Mg(OH)_2$ has an aspect ratio of about 3.1-5.

To prevent aggregation of inorganic particles, beads were introduced to the first slurry and the second slurry in the same amount as the inorganic particles. In addition, a wetting agent (anionic compound, sodium sulfate <1%) was added to reduce the contact angle between the beads and the solvent. The mixture was blended by using a paint shaker system twice, each time for 50 minutes.

A doctor blade system was used to apply the second slurry onto the polymer substrate and dried at room temperature by using a drying system to prevent liquid concentration caused by the surface tension of the solvent. Next, the first slurry was applied and dried in the same manner as described above. Plate-like particles were distributed largely in the lower layer of the resultant separator and the lower layer had a thickness of about 3.0 μm. In addition, spherical particles were distributed largely in the upper layer and the upper layer had a thickness of about 3.2 μm.

COMPARATIVE EXAMPLE 2

First, a polyethylene porous polymer substrate was prepared (polyethylene, thickness 7 μm, porosity 32%). Next, slurry for a porous coating layer was prepared.

The slurry was prepared by mixing a solvent (acetone) with alumina ($Al_2O_3$, $D_{50}$: 0.5 μm) particles, PVDF-HFP and cyano-containing binder (cyanoethylated poly(vinyl alcohol)) at a ratio of 9:1:2. The alumina particles have an aspect ratio of 1-1.5. The slurry has a solid content of 18%. To prevent aggregation of inorganic particles, beads were introduced in the same amount as the inorganic particles and the mixture was blended by using a paint shaker system twice, each time for 50 minutes. The polymer substrate was dipped in the slurry to obtain a separator having a porous coating layer through a dip coating process.

2. Evaluation of Properties of Separator

1) Puncture Strength Test

Puncture strength was determined by measuring the maximum load, when each of the separators according to Example and Comparative Examples was stabbed with a needle having a diameter of 1 mm (R: 0.5 mm) at a speed of 120 mm/min. Puncture was carried out at three different positions of each of the separators according to Example and Comparative Examples and the average values were recorded.

TABLE 1

| Maximum puncture strength (kgf) | Example | Comp. Ex. 1 | Comp. Ex. 2 |
| --- | --- | --- | --- |
| #1 | 0.2969 | 0.2766 | 0.2568 |
| #2 | 0.2707 | 0.2719 | 0.2634 |
| #3 | 0.2740 | 0.2759 | 0.2620 |
| Average | 0.2739 | 0.2748 | 0.2607 |

As can be seen from the above test results, the separator according to Example shows higher puncture strength as compared to the separators according to Comparative Examples 1 and 2. Particularly, the separator according to Examples shows puncture strength improved by about 5.1% as compared to the separator according to Comparative Example 2.

2) Heat Resistance Test

Three samples (10 cm×10 cm) were prepared from each of the separators according to Example and Comparative Examples 1 and 2. Each sample was allowed to stand in an oven at 150° C. for 30 minutes. Then, each sample was taken out of the oven and the dimension thereof was checked to determine the shrinkage of each separator based on the dimension of the original separator. The results are shown in the following Table 2.

TABLE 2

| | Reduction in area (%) | | | | | |
| --- | --- | --- | --- | --- | --- | --- |
| | Example | | Comp. Ex. 1 | | Comp. Ex. 2 | |
| | Reduction in area (%) | Transverse/Longitudinal length shrinkage (%) | Reduction in area (%) | Transverse/Longitudinal length shrinkage (%) | Reduction in area (%) | Transverse/Longitudinal length shrinkage (%) |
| Sample 1 | 3.96 | 2   2 | 7.84 | 4   4 | 14.46 | 9   6 |
| Sample 2 | 3.96 | 2   2 | 10.7 | 5   6 | 14.46 | 9   6 |
| Sample 3 | 6.88 | 3   4 | 7.85 | 5   3 | 14.46 | 9   6 |
| Average | 4.93 | 2.33   2.67 | 8.80 | 4.67   4.33 | 14.46 | 9   6 |

As can be seen from the above test results, the separator according to Example has significantly higher heat resistant characteristics.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A separator for an electrochemical device which comprises:
   a porous polymer substrate including a polymer resin; and
   a porous coating layer formed on at least one surface of both surfaces of the porous polymer substrate,
   the inorganic particles a) are plate-like inorganic particles and the inorganic particles b) are spherical inorganic particles,
   the porous coating layer comprises the inorganic particles b) in an amount of 50 wt % or more based on 100 wt % of the combined weight of the inorganic particles a) and b) in the portion from the bottom close to the porous polymer substrate to 10% of the thickness, when viewed from the thickness direction, and
   the porous coating layer comprises the inorganic particles a) in an amount of 50 wt % or more based on 100 wt % of the combined weight of the inorganic particles a) and b) in the portion from the surface of the porous coating layer facing to an electrode to 10% of the thickness, when viewed from the thickness direction,
   wherein the porous coating layer is a bilayer formed by the sequential steps of:

applying a first slurry comprising inorganic particles b) to the porous polymer substrate, drying the applied first slurry, applying a second slurry comprising inorganic particles a) to the porous polymer substrate, and drying the applied second slurry.

2. The separator for an electrochemical device according to claim 1, wherein the plate-like inorganic particles a) have an aspect ratio more than 3 and equal to or less than 100.

3. The separator for an electrochemical device according to claim 2, wherein the plate-like inorganic particles a) are boehmite.

4. The separator for an electrochemical device according to claim 1, wherein the spherical inorganic particles b) have an aspect ratio of 1-3.

5. The separator for an electrochemical device according to claim 1, wherein the porous coating layer comprises a mixture of the plate-like inorganic particles a), the spherical inorganic particles b) and a binder resin, wherein the binder resin is present in an amount of 3-10 wt % based on the total weight of the porous coating layer.

6. The separator for an electrochemical device according to claim 1, which has a puncture strength of 0.26 kgf or more.

7. An electrochemical device comprising a positive electrode, a negative electrode and a separator interposed between the positive electrode and negative electrode, wherein the negative electrode comprises lithium metal and the separator is defined in claim 1.

8. The separator for an electrochemical device according to claim 1, wherein the porous coating layer comprises a mixture of the plate-like inorganic particles a), the spherical inorganic particles b) and a binder resin, wherein the binder resin is present in an amount of 3-10 wt % based on the total weight of the porous coating layer, and wherein the binder resin is at least one binder resin selected from the group consisting of polyvinylidene fluoride-co-hexafluoropropylene, polyvinylidene fluoride-co-trichloroethylene, polymethylmethacrylate, polyethyl acrylate, polymethyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinylalcohol, cyanoethyl cellulose, cyanoethyl sucrose, pullulan and carboxymethyl cellulose.

* * * * *